United States Patent [19]
Tezuka

[11] Patent Number: 6,007,145
[45] Date of Patent: Dec. 28, 1999

[54] FLOOR STRUCTURE OF VEHICLE BODY

[75] Inventor: Kaoru Tezuka, Kanagawa-ken, Japan

[73] Assignee: Nissan Motor Co., Ltd., Kanagawa-ken, Japan

[21] Appl. No.: 09/280,995

[22] Filed: Mar. 30, 1999

[30] Foreign Application Priority Data

Apr. 14, 1998 [JP] Japan .................................. P10-102534

[51] Int. Cl.⁶ .................................................. B62D 25/20
[52] U.S. Cl. ........................ 296/204; 296/203.01; 296/29
[58] Field of Search .............................. 296/203.01, 204, 296/205, 208, 195, 193, 29

[56] References Cited

U.S. PATENT DOCUMENTS

| | | | |
|---|---|---|---|
| 4,514,008 | 4/1985 | Watanabe et al. | 296/204 |
| 5,102,187 | 4/1992 | Harasaki | 296/204 |
| 5,611,593 | 3/1997 | Fukagawa et al. | 296/204 |
| 5,806,918 | 9/1998 | Kanazawa | 296/204 |

FOREIGN PATENT DOCUMENTS 7-251761  10/1995  Japan .

*Primary Examiner*—D. Glenn Dayoan
*Assistant Examiner*—Patricia Engle
*Attorney, Agent, or Firm*—McDermott, Will & Emery

[57] ABSTRACT

A floor structure of a vehicle body is provided with a floor having a tunnel member disposed in the center of the vehicle body with respect to the width direction of the vehicle body such that it extends in the forward/backward direction of the vehicle body and a floor member disposed adjacent to the tunnel member in the width direction of the vehicle body. The floor member has a joint portion joining to the tunnel member. The floor structure is further provided with a closed section formed at a root portion of the tunnel member by use of the tunnel member and the floor member, and a cross member disposed on the floor member such that it extends in the width direction of the vehicle body. The cross member has a flange portion connected to the tunnel member. Here, the joint portion of the floor member to be joined to the tunnel member overlaps the flange portion of the cross member to be connected to the tunnel member throughout entire of the flange portion.

7 Claims, 3 Drawing Sheets

FLOOR STRUCTURE OF VEHICLE BODY

BACKGROUND OF THE INVENTION

The present invention relates to a floor structure of a vehicle body, and, more particularly, relates to a floor structure of a vehicle body including a joint portion in which an end of a cross member extending on a floor member of a vehicle body in the width direction thereof is joined to a tunnel member extending at a center portion of the vehicle body in the forward/backward direction thereof.

Japanese Patent Application Laid-Open No. H7-251761 has disclosed a floor structure of a vehicle body including a joint portion in which an end portion of a cross member extending on a floor member of a vehicle body in the width direction thereof is joined to a tunnel member extending at a center portion of the vehicle body in the forward/backward direction thereof.

SUMMARY OF THE INVENTION

Generally, a floor structure of a vehicle body is is structured by use of a tunnel member extending at a center portion of the vehicle body in its forward/backward direction and floor members disposed both on the right and left sides of the vehicle body so that they are adjacent to the tunnel member. A side end portion of each of the floor members is joined to an external side face of the tunnel member at a root portion of the tunnel member and an outside end portion of the tunnel member is joined to a bottom face of each of the floor members so that a closed section is produced. Also, plurality of cross members are provided on the right and left floor members, respectively, such that they extend in the width direction of the vehicle body. An end of each of the cross members is joined to the external side face of the tunnel member.

In such a floor structure of the vehicle, it is an important design matter to secure air tightness and water tightness with respect to a passenger compartment of the vehicle body located over the floor structure.

According to consideration of the inventor of the present invention, a general countermeasure to secure such a air tightness and water tightness of the passenger compartment is to seal the joint portion between the outside end portion of the tunnel member and the bottom face of each of the floor member constituting the closed section by applying sealing material from the bottom of the vehicle body and then clog working holes provided appropriately in the bottom face of the closed section as required with corresponding plugs after a predetermined work is finished.

However, the application of the sealing material to the joint portion needs to be carried out from below the vehicle body in a upward facing style. Further, fitting of the plugs is also carried out from below the vehicle body in the upward facing style. In such a work on mass production line, workers need to devise their working postures and the vehicle body itself needs to be lifted up or tilted. Thus, it is preferable to eliminate such a work in viewpoints of load on the workers, required accuracy of the work, difficulty in design of the mass production line and production cost as much as possible.

Further, in viewpoints of the strength of the vehicle body, because seat rails on which a seat is to be fixed are attached on the cross members, the strength of the joint portion between each of the cross members and tunnel member has been demanded to be more intensified.

Accordingly, an object of the present invention is to provide a floor structure of a vehicle body capable of achieving a better working efficiency without an increase of production cost and ensuring a sufficient strength.

To achieve the above object of the present invention, there is provided a floor structure of vehicle body, comprising a floor having a tunnel member disposed at the center portion of the vehicle body with respect to the width direction of the vehicle body such that it extends in the forward/backward direction of the vehicle body and a floor member disposed adjacent to the tunnel member in the width direction of the vehicle body. The floor member has a joint portion joining to the tunnel member. The floor structure is further provided with a closed section formed at a root portion of the tunnel member by use of the tunnel member and the floor member, and a cross member disposed on the floor member so as to extend in the width direction of the vehicle body. The cross member has a flange portion connected to the tunnel member. Here, the joint portion of the floor member to be joined to the tunnel member overlaps the flange portion of the cross member to be connected to the tunnel member throughout entire of the flange portion.

DETAILED DESCRIPTION OF THE PREFERRED EMBODIMENT

Hereinafter, the embodiment of the present invention will be described in detail with reference to the accompanying drawings.

In FIGS. 1 to 5, an arrow FR indicates the forward of a vehicle body 1, an arrow R indicates the right side thereof, an arrow L indicates the left side thereof, and an arrow UPR indicates upward thereof.

Figure 1:
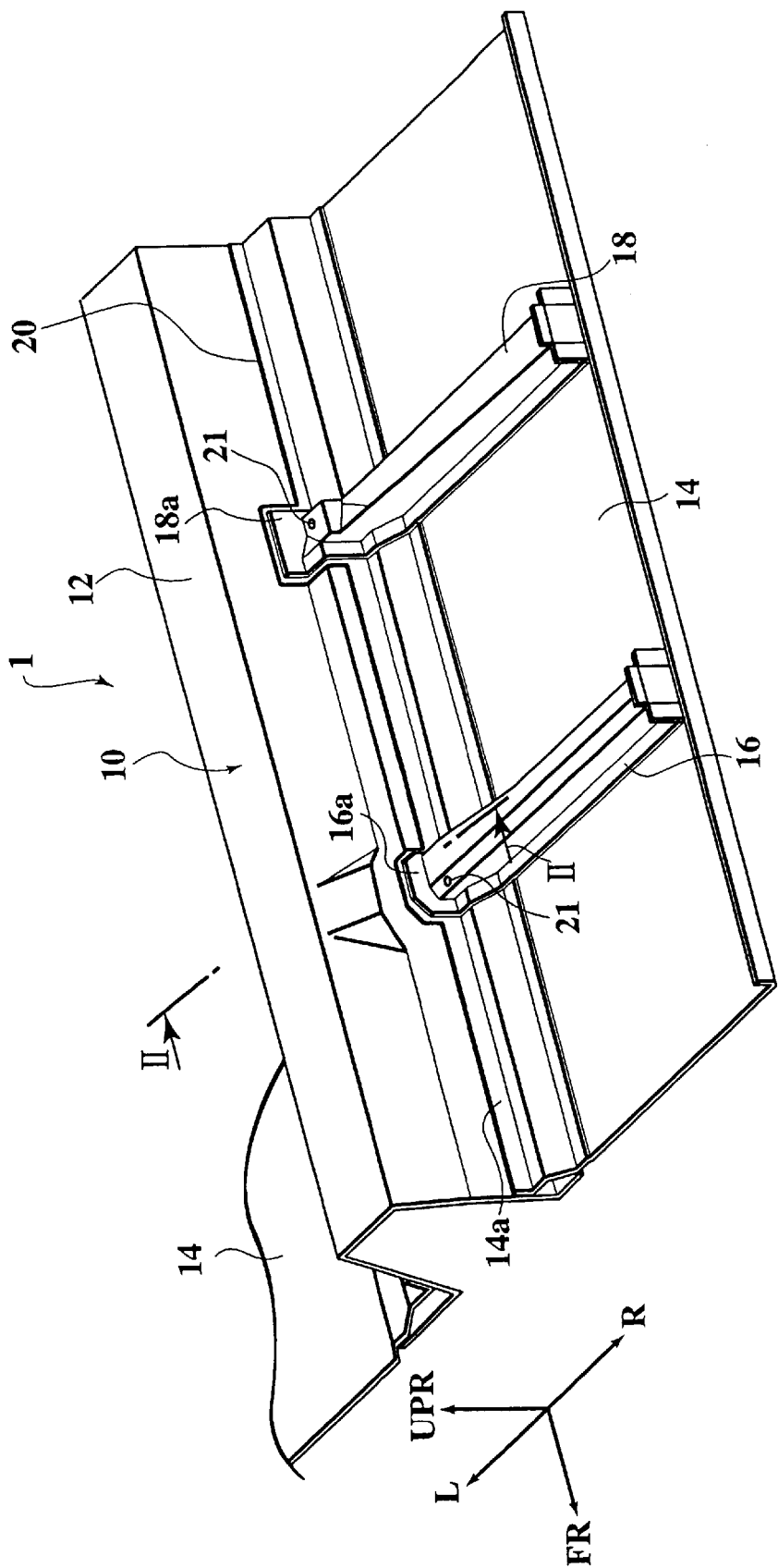
FIG. 1 is a perspective view of major parts of a floor structure of a vehicle body according to an embodiment of the present invention.
Figure 2:
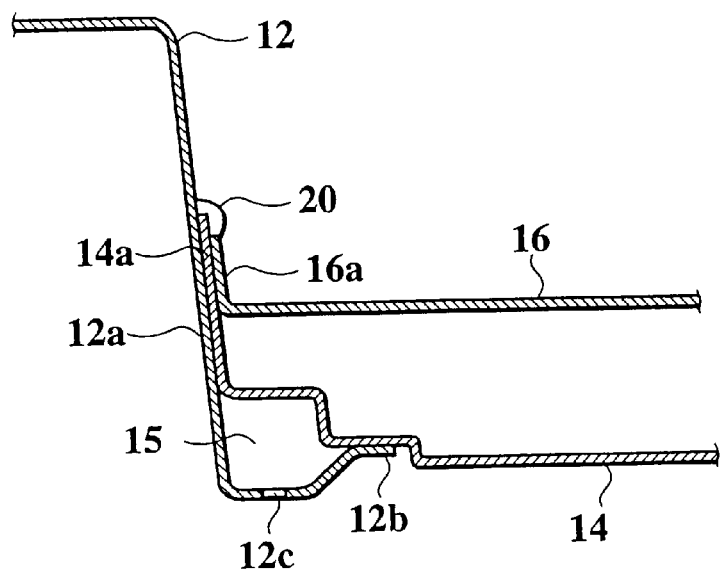
FIG. 2 is a sectional view taken along the line II—II of FIG. 1 according to the embodiment.

A floor 10 of the vehicle body 1 is structured by use of a tunnel member 12 disposed at a center portion of the floor 10 in the rightward/leftward direction of the vehicle body 1, namely in the width direction of the vehicle body 1, such that the tunnel member 12 extends in the forward/backward direction of the vehicle body 1 and right and left floor members 14, 14 which are disposed on both sides of the tunnel member 12 and joined to the tunnel member 12. At a root portion of the tunnel member 12 as shown in FIG. 2, a side end portion 14a of each of the floor members 14, 14 is joined to an external side face 12a of the tunnel member 12 and an outside end portion 12b of the tunnel member 12 is joined to a bottom face of each of the floor members 14, 14 so that a closed section 15 is formed at each of the root portions of the tunnel member 12. A working hole 12c is formed in a bottom face of each closed section 15 and the bottom face of each closed section 15 is lower than the bottom face of each floor member 14.

Right and left second cross members 16, 16 extending in the width direction of the vehicle body 1 (only one side is shown here since they are symmetrical) and right and left third cross members 18, 18 extending in the width direction of the vehicle body 1 (only one side is shown here because they are symmetrical) are disposed on the floor members 14, 14. End flanges 16$a$, 18$a$ are respectively provided to the cross members 16, 18 so as to be at the center portion in the width direction of the vehicle body 1 and are respectively connected to the tunnel member 12.

Figure 3:
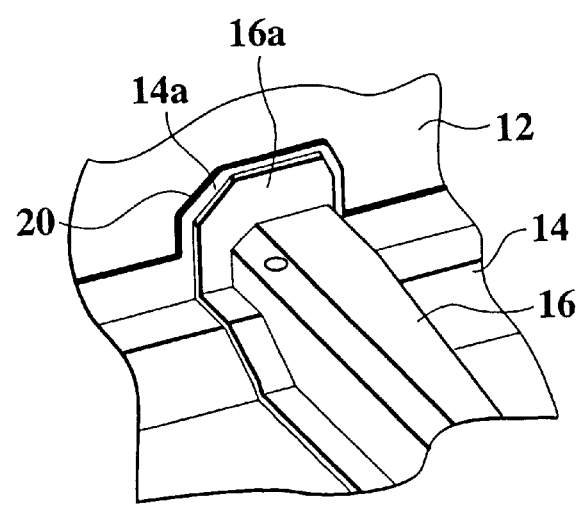
FIG. 3 is a perspective view showing a joint portion between a second cross member and a tunnel member of FIG. 1 according to the embodiment.
Figure 4:
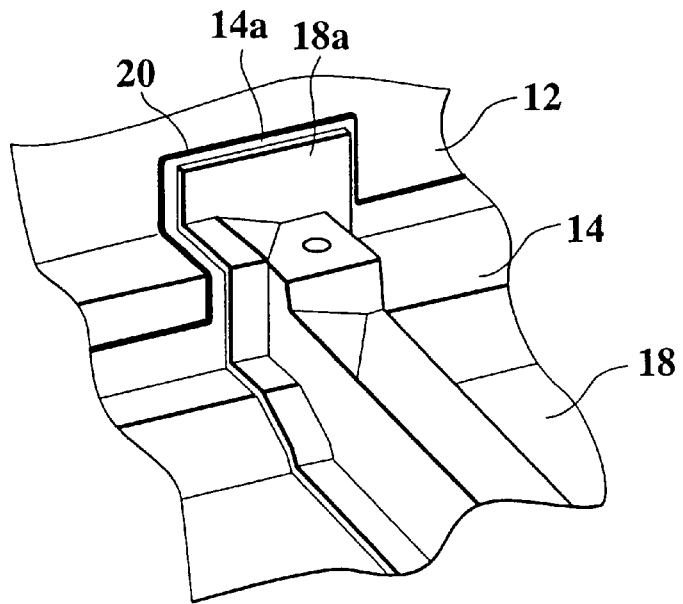
FIG. 4 is a perspective view showing a joint portion between a third cross member and a tunnel member of FIG. 1 according to the embodiment.

As shown in detail in FIGS. 2 to 4, corresponding to the joint portions of the cross members 16, 18 to the tunnel member 12, side end portions 14$a$, 14$a$ of the floor members 14, 14 extend so as to overlap the end flanges 16$a$, 18$a$ of the cross members 16, 18 throughout the entire portions of the cross members 16, 18. More in detail, the side end portions 14$a$, 14$a$ protrude from the end flanges 16$a$, 18$a$. The side end portions 14$a$, 14$a$ are spot-welded to the tunnel member 12 together with the end flanges 16$a$, 18$a$.

To prevent water and smell or the like from invading into the vehicle compartment through the joint portions between the floor members 14, 14 and tunnel member 12, sealing material 20 is entirely applied in each of gaps between edges of the side end portions 14$a$, 14$a$ of the floor members 14, 14 and tunnel member 12 in the forward/backward direction of the vehicle body 1. It is needless to say, at this time, that the sealing material 20 may be extruded over the gaps between the side end portions 14$a$, 14$a$ of the floor members 14, 14 and the end flanges 16$a$, 18$a$ of the cross members 16, 18.

Figure 5:
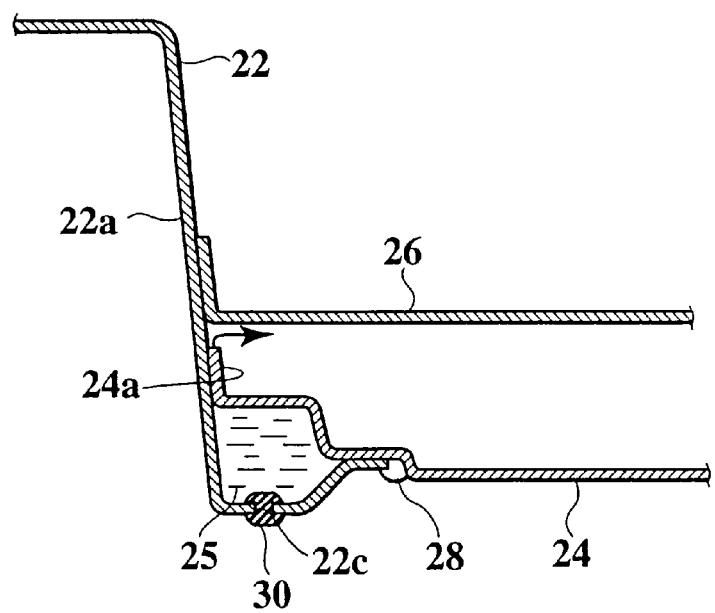
FIG. 5 is a sectional view of the floor structure of a general vehicle body for comparison with FIG. 2.

More specifically, this structure will be made apparent if it is compared to a general conventional structure. Generally in a structure in which each of floor members 24, 24 is not extended as shown in FIG. 5, a side end portion 24$a$ of the floor member 24 is hidden by a cross member 26, so that the sealing material cannot be applied entirely at such a portion hidden by the cross member 26 in the forward/backward direction of the vehicle body. Therefore, from below the floor members 24, 24, the sealing material 28 is respectively applied to gaps between the floor members 24, 24 and tunnel member 22 and further, plugs 30, 30 are fit to a working hole 22$c$ bored appropriately in a bottom portion of the tunnel member 22. However, in this structure, the application work of the sealing materials 28 and the fitting work of the plugs 30 must be carried out from below the floor members 24, 24 and, if water invades into closed sections 25, 25 each of which is formed at the root portion of the tunnel member 22 from the other portion, that water leaks into the vehicle compartment as indicated by an arrow in FIG. 5 through each of gaps between external side faces 22$a$, 22$a$ of the tunnel member 22 and side end portions 24$a$, 24$a$ of the floor members 24, 24 and further, the water invaded into the closed sections 25, 25 may not be drained for a long time.

On the contrary, according to this embodiment, the end flanges 16$a$, 18$a$ of the respective cross members 16, 18 are connected to the side end portions 14$a$, 14$a$ of the floor members 14, 14 as well as the tunnel member 12.

Due to such a structure, in viewpoint of the strength, each input force applied through fixing points 21, 21 for fixing seat rails (not shown) to be attached on the cross members 16, 18 is received by the tunnel member 12 and the floor member 14, so that the strength of the vehicle body 1 when such an input force is applied is improved.

Further, according to such a structure, the end flanges 16$a$, 18$a$ of the respective cross members 16, 18 overlap the side end portions 14$a$, 14$a$ of the floor members 14, 14 in addition that they are connected to the tunnel member 12. That is, corresponding to the joint portions of the cross members 16, 18 to the tunnel member 12, the side end portions 14$a$, 14$a$ of the floor members 14, 14 are extended so as to overlap that joint portions. Therefore, the sealing material 20 can be applied to each of the joint portions. Further, at this time, the application work for the sealing material 20 can be carried out entirely from above the floor 10 in the forward/backward direction of the vehicle body 1 of the floor member 14, thereby improvement of working efficiency and reduction of production cost being achieved. Since the sealing material 20 can be applied securely around the end flanges 16$a$, 18$a$ of the respective cross members 16, 18, each of the entire joint portions between the floor members 14, 14 and the tunnel member 12 can be coated with the sealing material 20 by a work above the floor 10. Further, Since the side end portions 14$a$, 14$a$ of the floor members 14, 14 are elongated upward and forward/backward of the vehicle body 1 relative to the end flanges 16$a$, 18$a$ of the respective cross members 16, 18, the application of each sealing material 20 can be carried out more securely. Of course, depending on needs, the side end portions 14$a$, 14$a$ of the floor members 14, 14 can be elongated upward or forward/backward of the vehicle body 1 relative to the end flanges 16$a$, 18$a$ of the respective cross members 16, 18.

Further, according to the above structure, a necessity of clogging the working holes 12$c$ provided in the bottom faces of the tunnel members 12, 12 constituting a part of the closed sections with plugs is eliminated, thereby further achieving the improvement of the working efficiency and reduction of production cost. Because each of the working holes 12$c$ is not clogged with any plugs, even if foreign matter such as water invades into the closed sections 15, 15, it can be drained quickly outside through the working holes 12$c$. Still further, because a bottom face of each closed section 15 is located downward of the vehicle body 1 with respect to the floor member 14, the drainage of such foreign matter can be performed further effectively.

The entire contents of a Patent Application No. TOKUGANHEI 10-102534, with a filling date of Apr. 14, 1998 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A floor structure of a vehicle body, comprising:
    a floor having a tunnel member provided at a center portion in a width direction of the vehicle body so as to extend in a forward/backward direction of the vehicle body and a floor member disposed adjacent to the tunnel member in the width direction of the vehicle body, the floor member having a joint portion joining to the tunnel member;
    a closed section provided at a root portion of the tunnel member, the closed section being defined by the tunnel member and the floor member; and
    a cross member provided on the floor member so as to extend in the width direction of the vehicle body, the cross member having a flange portion at an end portion thereof, and the flange portion being connected to the tunnel member,
    wherein the joint portion of the floor member to be joined to the tunnel member overlaps the flange portion of the cross member to be connected to the tunnel member throughout entire of the flange portion.

2. A floor structure of a vehicle body according to claim 1, wherein sealing material is applied corresponding to a portion in which the joint portion of the floor member to be joined to the tunnel member overlaps the flange portion of the cross member to be connected to the tunnel portion.

3. A floor structure of a vehicle body according to claim 2, wherein the sealing material is applied throughout entire of the joint portion of the floor member to be joined to the tunnel member.

4. A floor structure of a vehicle body according to claim 1, wherein the joint portion of the floor member to be joined to the tunnel member protrudes upward and/or forward/backward of the vehicle body beyond the flange portion of the cross member to be connected to the tunnel member.

5. A floor structure of a vehicle body according to claim 1, wherein the closed section is defined by joining a side end portion of the floor member and an external side face of the tunnel member and joining a bottom face of the floor member and an outside end portion of the tunnel member.

6. A floor structure of a vehicle body according to claim 1, wherein a bottom portion of the closed section is located at a position lower than that of a bottom portion of the floor member with respect to the vehicle body.

7. A floor structure of a vehicle body according to claim 1, wherein the floor member includes a right floor member disposed on a right side of the vehicle body so as to adjoin the tunnel member and a left floor member disposed on a left side of the vehicle body so as to adjoin the tunnel member, the closed section includes a right closed section formed on the right side of the vehicle body at the root portion of the tunnel member and a left closed section formed on the left side of the vehicle body at the root portion of the tunnel member, and the cross member includes a right cross member disposed on the right floor member so as to extend in the width direction of the vehicle body and a left cross member disposed on the left floor member so as to extend in the width direction of the vehicle body.

* * * * *